(12) United States Patent
Rahmes et al.

(10) Patent No.: US 12,443,865 B2
(45) Date of Patent: Oct. 14, 2025

(54) AUTOMATIC DEPENDENT SURVEILLANCE BROADCAST (ADS-B) SYSTEM PROVIDING ANOMALY DETECTION AND RELATED METHODS

(71) Applicant: Eagle Technology, LLC, Melbourne, FL (US)

(72) Inventors: Mark D. Rahmes, Melbourne, FL (US); Kevin L. Fox, Palm Bay, FL (US); Gran Roe, Melbourne, FL (US); Christopher Jason Berger, Leesburg, VA (US); Ralph Smith, Oak Hill, VA (US); Timothy B. Faulkner, Palm Bay, FL (US); Robert Konczynski, Melbourne, FL (US); Kevin R. Niewoehner, Stafford, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 715 days.

(21) Appl. No.: 17/814,932

(22) Filed: Jul. 26, 2022

(65) Prior Publication Data
US 2024/0037426 A1  Feb. 1, 2024

(51) Int. Cl.
G06N 5/04 (2023.01)
G06N 7/01 (2023.01)
G08G 5/22 (2025.01)

(52) U.S. Cl.
CPC .............. G06N 5/042 (2013.01); G06N 7/01 (2023.01); G08G 5/22 (2025.01)

(58) Field of Classification Search
None
See application file for complete search history.

(56) References Cited

U.S. PATENT DOCUMENTS

| 10,181,185 B2 | 1/2019 | Park et al. |
| 10,248,742 B2 | 4/2019 | Desell et al. |

(Continued)

OTHER PUBLICATIONS

Fox et al. "Utilizing sinthetic data for VV&C of machine learning applications" 2022 Integrated Communications Navigation and Surveillance (ICNS) Conference Apr. 5-7, 2022; pp. 14.

(Continued)

Primary Examiner — Wilson Lee
(74) Attorney, Agent, or Firm — ALLEN, DYER, DOPPELT, + GILCHRIST, P.A.

(57) ABSTRACT

An Automatic Dependent Surveillance Broadcast (ADS-B) system may include a plurality of ADS-B terrestrial stations, with each ADS-B terrestrial station comprising an antenna and wireless circuitry associated therewith defining a station gain pattern. The system may further include a controller including a variational autoencoder (VAE) configured to compress station pattern data from the plurality of ADS-B terrestrial stations, create a normal distribution of the compressed data in a latent space of the VAE, and decompress the compressed station pattern data from the latent space. The controller may also include a processor coupled to the VAE and configured to process the decompressed station pattern data using a probabilistic model selected from among different probabilistic models based upon a game theoretic reward matrix, determine an anomaly from the processed decompressed station pattern data, and generate an alert (e.g., a station specific alert) based upon the determined anomaly.

20 Claims, 11 Drawing Sheets

(56) References Cited

U.S. PATENT DOCUMENTS

| | | | |
|---|---|---|---|
| 10,373,056 | B1 | 8/2019 | Andoni et al. |
| 10,410,113 | B2 | 9/2019 | Clayton et al. |
| 10,528,533 | B2 | 1/2020 | Saini et al. |
| 10,593,033 | B2 | 3/2020 | Niculescu-Mizil et al. |
| 10,600,009 | B1 | 3/2020 | Augustine et al. |
| 10,616,257 | B1 | 4/2020 | Soulhi et al. |
| 10,665,251 | B1 | 5/2020 | Wood, III et al. |
| 10,679,129 | B2 | 6/2020 | Baker |
| 10,733,722 | B2 | 8/2020 | Niculescu-Mizil et al. |
| 10,743,809 | B1 | 8/2020 | Kamousi et al. |
| 10,789,703 | B2 | 9/2020 | Lu et al. |
| 10,812,523 | B2 | 10/2020 | Latapie et al. |
| 10,817,394 | B2 | 10/2020 | Oba |
| 10,839,320 | B2 | 11/2020 | Augustine et al. |
| 10,848,508 | B2 | 11/2020 | Chen et al. |
| 10,860,928 | B2 | 12/2020 | Mnih et al. |
| 10,872,209 | B2 | 12/2020 | Ha et al. |
| 10,880,763 | B1 | 12/2020 | Vela et al. |
| 10,909,419 | B2 | 2/2021 | Itou et al. |
| 10,909,671 | B2 | 2/2021 | Kimura et al. |
| 10,931,700 | B2 | 2/2021 | Soulhi et al. |
| 10,964,011 | B2 | 3/2021 | Cosatto et al. |
| 10,970,395 | B1 | 4/2021 | Bansal et al. |
| 2003/0018928 | A1 | 1/2003 | James et al. |
| 2019/0377870 | A1 | 12/2019 | Daniel et al. |
| 2020/0183047 | A1 | 6/2020 | Denli et al. |
| 2020/0193418 | A1 | 6/2020 | Augustine et al. |
| 2020/0342362 | A1 | 10/2020 | Soni et al. |
| 2021/0065070 | A1 | 3/2021 | Augustine et al. |
| 2022/0021477 | A1* | 1/2022 | Ge .................... H04L 1/0041 |
| 2022/0060235 | A1* | 2/2022 | Namgoong ............ G06N 3/047 |
| 2022/0091275 | A1 | 3/2022 | Held et al. |
| 2022/0321961 | A1* | 10/2022 | Hama ................ H04N 21/4532 |
| 2023/0007530 | A1* | 1/2023 | Vitthaladevuni ...... G06N 20/20 |
| 2023/0090593 | A1* | 3/2023 | Kim .................... H04L 1/00 370/252 |
| 2024/0202542 | A1* | 6/2024 | Lindbom ............... G06N 3/045 |

OTHER PUBLICATIONS

Amini et al. "Variational Autoencoder for End-To-End Control of Autonomous Driving With Novelty Detection and Training De-Biasing" 2018 IEEE/RSJ International Conference on Intelligent Robots and Systems (IROS): Oct. 2018; pp. 568-575.

An et al. "Variational Autoencoder Based Anomaly Detection Using Reconstruction Probability" Special Lecture on IE: 2(1) 2015; pp. 1-18.

Chen et al. "Unsupervised Anomaly Detection of Industrial Robots Using Sliding-Window Convolutional Variational Autoencoder" IEEE Access, 8, 2020: 47072-47081.

Daudt et al. "Urban Change Detection for Multispectral Earth Observation Using Convolutional Neural Networks" In IEEE International Geoscience and Remote Sensing Symposium (IGARSS): Jul. 2018; pp. 2115-2118.

Fan et al. "Video Anomaly Detection and Localization via Gaussian Mixture Fully Convolutional Variational Autoencoder" Computer Vision and Image Understanding: (2020) 195, 102920; pp. 13.

Gong et al. "Memorizing Normality to Detect Anomaly: Memory-Augmented Deep Autoencoder for Unsupervised Anomaly Detection" In Proceedings of the IEEE/CVF International Conference on Computer Vision: 2019; pp. 1705-1714.

Kawachi et al. "Complementary Set Variational Autoencoder for Supervised Anomaly Detection" In 2018 IEEE International Conference on Acoustics, Speech and Signal Processing (ICASSP): Apr. 2018; pp. 2366-2370; Abstract Only.

Kingma et al. Auto-Encoding Variational Bayes arXiv preprint arXiv:1312.6114 https://arxiv.org/abs/1312.6114: Dec. 2013; pp. 14.

Lecun et al. "The MNIST Database of Handwritten Digits" http://yann.lecun.com/exdb/mnist retrieved from internet Jul. 15, 2022; pp. 6.

Li et al. "Anomaly Detection of Time Series With Smoothness-Inducing Sequential Variational Auto-Encoder" IEEE transactions on neural networks and learning systems: 2020; pp. 15.

Memarzadeh et al. "Unsupervised Anomaly Detection in Flight Data Using Convolutional Variational Auto-Encoder" Aerospace 2020, 7(8), 115; pp. 19.

Nguyen et al. "GEE: A Gradient-based Explainable Variational Autoencoder for Network Anomaly Detection" https://arxiv.org/abs/1903.06661; Mar. 15, 2019; pp. 10.

Norlander et al. "Latent Space Conditioning for Improved Classification and Anomaly Detection" https://www.semanticscholar.org/paper/Latent-space-conditioning-for-improved-and-anomaly-Norlander-Sopasakis/d0edbd735bd1083eee1d097f7de33d38777f72d1: Dec. 2, 2019; pp. 18.

Sun et al. "Learning Sparse Representation With Variational Auto-Encoder for Anomaly Detection" IEEE Access, 6, 2018; pp. 33353-33361.

Wang et al. "Deep Learning for Anomaly Detection" In Proceedings of the 13th International Conference on Web Search and Data Mining: Jan. 2020; pp. 894-896.

Wiewel et al. "Continual Learning for Anomaly Detection With Variational Autoencode" In IEEE International Conference on Acoustics, Speech and Signal Processing (ICASSP): May 2019; pp. 3837-3841. Abstract Only.

Xu et al. "Unsupervised Anomaly Detection via Variational Auto-Encoder for Seasonal KPIs in Web Applications" In Proceedings of the 2018 World Wide Web Conference: Apr. 2018; pg.

Yan et al. "Abnormal Event Detection From Videos Using a Two-Stream Recurrent Variational Autoencoder" IEEE Transactions on Cognitive and Developmental Systems, 12(1) Nov. 25, 2018; pp. 30-42.

Yao et al. "Unsupervised Anomaly Detection Using Variational Auto-Encoder Based Feature Extraction" In 2019 IEEE International Conference on Prognostics and Health Management (ICPHM): Jun. 2019; Abstract Only.

Zavrak et al. "Anomaly-based intrusion detection from network flow features using variational autoencoder" IEEE Access, 8: Jun. 2020; pp. 13.

Zerrouki et al. "Desertification Detection Using an Improved Variational Autoencoder-Based Approach Through ETM-Landsat Satellite Data" IEEE Journal of Selected Topics in Applied Earth Observations and Remote Sensing, 14: Dec. 2020; pp. 13.

Zimmerer et al "Context-Encoding Variational Autoencoder for Unsupervised Anomaly Detection" Medical Imaging with Deep Learning 2019: https://arxiv.org/abs/1907.12258 arXiv preprint arXiv:1812.05941: pp. 6.

Easa and Daedalean "Concepts of Design Assurance for Neural Networks (CoDANN) II Public Extract" EASA AI Task Force and Daedalean AG: 2021; pp. 113.

SAE International, On-Road Automated Driving (ORAD) Committee, "Taxonomy & Definitions for Operational Design Domain (ODD) for Driving Automation Systems J3259," Jul. 15, 2021. [Online]. Available: https://www.sae.org/standards/content/j3259/?force_isolation=true; Abstract Only.

Society of Automotive Engineers (SAE) "Surface Vehicle Recommended Practice" J3016; Apr. 2021; pp. 41.

Niewoehner et al. "Novel Framework to Advance Verification, Validation, and Certification of Non-Deterministic, AI-Based Algorithms for Safety Critical Applications" The Journal of Air Traffic Control, Fall 2021; vol. 63, No. 3, pp. 14-29, Sep. 2021.

* cited by examiner

AUTOMATIC DEPENDENT SURVEILLANCE BROADCAST (ADS-B) SYSTEM PROVIDING ANOMALY DETECTION AND RELATED METHODS

TECHNICAL FIELD

This application relates to the field of communication systems, and, more particularly, to Automatic Dependent Surveillance Broadcast (ADS-B) systems and related methods.

BACKGROUND

Interest in automation continues to grow, in particular with regard to Artificial Intelligence (AI) and Machine Learning (ML). Utilizing sample data (i.e. training data), ML algorithms build a model to make decisions or predictions without explicitly programming the ML model to do so. ML is revolutionizing applications ranging from recommendation engines to process automation and real-time command and control. Ground transportation is witnessing the push for automation with AI/ML technologies, such as vehicle autopilot features, and self-driving capabilities for long-haul trucking.

In the domain of airborne systems, the European Union Aviation Safety Agency (EASA) has identified that ML-based automation presents major opportunities for the aviation industry. EASA published a roadmap aimed at creating a risk-based "AI trustworthiness" framework to enable future AI/ML applications and support European research and leadership in AI (EASA and Daedalean, "Report: Concepts of Design Assurance for Neural Networks (CoDANN) II, Public Extract," EASA AI Task Force and Daedalean AG, 2021). In Niewoehner et al., "Novel Framework to Advance Verification, Validation, and Certification of Non-Deterministic, AI-Based Algorithms for Safety Critical Applications", The Journal of Air Traffic Control, Vols. Fall 2021 | Vol. 63, No. 3, pp. 14-29, September 2021, the authors outlined current methodologies for safety validation, and the challenges for ML applications. The challenges for safety verification, validation, and certification (VV&C) of ML applications are difficult, but become even more difficult in domains where large sets of data are not readily available for system safety assessments in controlled environments.

U.S. Pat. No. 10,248,742 to Desell et al. discloses an approach for analyzing flight data using predictive models. A quadratic least squares model is applied to a matrix of time-series flight parameter data for a flight, thereby deriving a mathematical signature for each flight parameter of each flight in a set of data including a plurality of sensor readings corresponding to time-series flight parameters of a plurality of flights. The derived mathematical signatures are aggregated into a dataset. A similarity between each pair of flights within the plurality of flights is measured by calculating a distance metric between the mathematical signatures of each pair of flights within the dataset, and the measured similarities are combined with the dataset. A machine-learning algorithm is applied to the dataset, thereby identifying, without predefined thresholds, clusters of outliers within the dataset by using a unified distance matrix.

Despite the existence of such approaches, further gains in airborne or aviation systems which take advantage of ML approaches may be desirable in various applications.

SUMMARY

An Automatic Dependent Surveillance Broadcast (ADS-B) system may include a plurality of ADS-B terrestrial stations, with each ADS-B terrestrial station comprising an antenna and wireless circuitry associated therewith defining a station gain pattern. The system may further include a controller including a variational autoencoder (VAE) configured to compress station pattern data from the plurality of ADS-B terrestrial stations, create a normal distribution of the compressed data in a latent space of the VAE, and decompress the compressed station pattern data from the latent space. The controller may also include a processor coupled to the VAE and configured to process the decompressed station pattern data using a probabilistic model selected from among a plurality of different probabilistic models based upon a game theoretic reward matrix, determine an anomaly from the processed decompressed station pattern data, and generate an alert (e.g., a station specific alert) based upon the determined anomaly.

In an example embodiment, the VAE may be configured to compress the station pattern data with a first set of weights, and decompress the compressed station pattern data with a second set of weights different than the first set of weights. More particularly, the processor may be configured to update at least one of the first and second sets of weights based upon a loss detected in the processed decompressed station pattern data, for example.

In one example implementation, the station gain pattern may correspond to different radio frequency (RF) channels. The processor may be further configured to process the decompressed station pattern data using the probabilistic model based upon historical gain pattern data for respective antennas. By way of example, the plurality of different probabilistic models may include at least one of Adaptive Moment Estimation (ADAM), Stochastic Gradient Descent with Momentum (SGDM), and RMSProp deep learning models. Also by way of example, the alert may comprise a service alert for a respective antenna.

A related computing device or controller is also provided which may include a VAE and a processor coupled to the VAE, such as those discussed briefly above. A related method may include using a VAE for compressing station pattern data from a plurality of ADS-B terrestrial stations, with each ADS-B terrestrial station comprising an antenna and wireless circuitry associated therewith defining a station gain pattern, creating a normal distribution of the compressed data in a latent space of the VAE, and decompressing the compressed station pattern data from the latent space. The method may further include using a processor coupled for processing the decompressed station pattern data using a probabilistic model selected from among a plurality of different probabilistic models based upon a game theoretic reward matrix, determining an anomaly from the processed decompressed station pattern data, and generating an alert (e.g., a station specific alert) based upon the determined anomaly.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Generally speaking, the present disclosure is directed to approaches that combines a Machine Learning (ML) method to generate data with algorithmic transformations to help address certain technical challenges. One such challenge is training, and the approaches set forth herein allow for derivation of synthetic data enabling ML model training under a richer set of operational conditions. Another technical problem addressed by the present approach is safety validation, which is addressed through the use of algorithm data transformations as a basis for validation and verification scenario development. In particular, the present approach provides a particular technical advantage with regard to anomaly detection for the safety-critical Automatic Dependent Surveillance-Broadcast (ADS-B) service, such as by facilitating predictive maintenance decisions by generating synthetic data for sensitivity analysis of the ADS-B anomaly detection.

Figure 1:
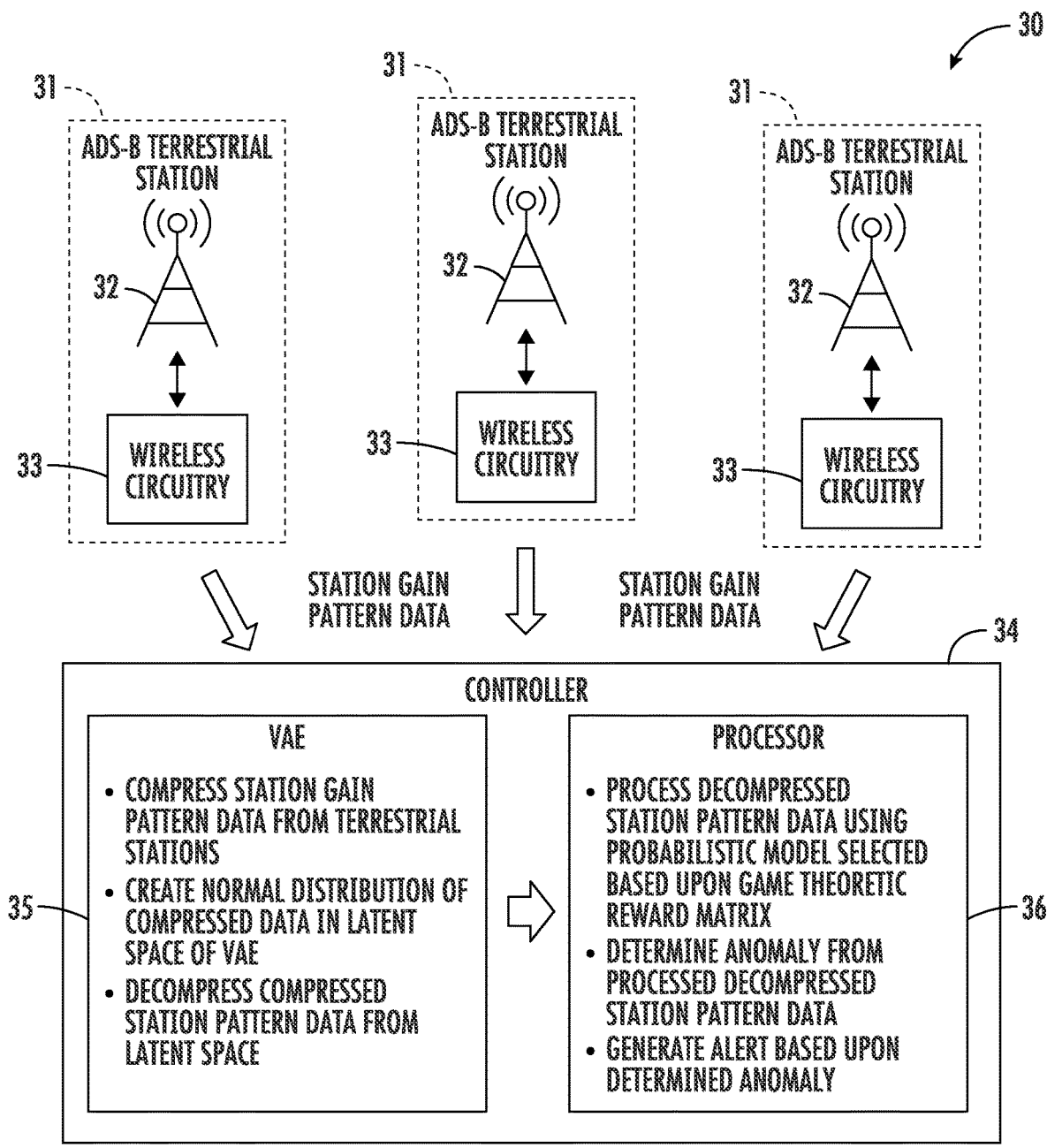
FIG. 1 is a schematic block diagram of an Automatic Dependent Surveillance Broadcast (ADS-B) system in accordance with an example embodiment.

Referring initially to FIG. 1, an example ADS-B system 30 illustratively includes a plurality of ADS-B terrestrial stations 31, with each ADS-B terrestrial station including an antenna 32 and wireless circuitry 33 associated therewith defining a station gain pattern. The system 30 further illustratively includes a controller 34 including a variational autoencoder (VAE) 35 configured to compress station pattern data from the plurality of ADS-B terrestrial stations 31, create a normal distribution of the compressed data in a latent space of the VAE, and decompress the compressed station pattern data from the latent space. The controller 34 also illustratively includes a processor 36 coupled to the VAE 35 and configured to process the decompressed station pattern data using a probabilistic model selected from among a plurality of different probabilistic models based upon a game theoretic reward matrix, determine an anomaly from the processed decompressed station pattern data, and generate an alert (e.g., a station specific alert) based upon the determined anomaly, as will be discussed further below. By way of example, the controller 34 may be implemented in one or more servers (which may be cloud servers in some embodiments) including appropriate hardware (e.g., microprocessors, etc.) and a non-transitory computer-readable medium having computer-executable instructions for performing the various operations described further below.

By way of background, in the basic ML model development paradigm, large amounts of data are used to "infer" an algorithm through training. In contrast to traditional algorithmic development, ML algorithms can build functional mappings using computation and data, without human limitations. These techniques for ML model development have been found to be very useful in applications such as vision, natural language processing, recommendation systems, anomaly detection, and more.

While providing many advantages, ML model-based components present special challenges when utilized within safety critical applications that require strict validation and certification prior to operational use. For example, ML components present a very difficult subset of non-analyzable digital systems. The actual transformation code of an ML model is not available, but the function is captured in a dynamic form (typically an inference function evaluation). Generally speaking, one is only left with black-box evaluation as a validation technique. The challenge becomes one of collecting data and generation of scenarios for validation. Given the expanse of the operational "space" for a variety of applications, the collection of data and exhaustive generation of scenarios to ensure comprehensive analytic coverage is unrealistic.

The term "Operational Design Domain (ODD)" describes the conditions under which an automated system or application is designed to function. For example, Society of Automotive Engineers (SAE) J3016 defines the ODD as the "Operating conditions under which a given driving automation system, or feature thereof, is specifically designed to function, including, but not limited to, environmental, geographical, and time-of-day restrictions, and/or the requisite presence or absence of certain traffic or roadway characteristics." SAE International, On-Road Automated Driving (ORAD) Committee, "Taxonomy & Definitions for Operational Design Domain (ODD) for Driving Automation Systems J3259," 15 Jul. 2021. With regard to "operating conditions", the conditions (limits) under which an automated system or application can operate safely should also be accounted for. The ODD describes the set of input values (operating conditions) for which an automated application is designed and trained to function properly and safely. The term "Out-of-Domain (OOD)" data describes the region beyond the range of values outside the operating conditions for which an automated system (an ML component) was designed to operate safely.

To address the validation of an ML component, one may gain insight by going back into its training structure. When the ODD for an automated application is well defined, a verification and validation (V&V) structure may be built that generates scenarios informed by the intersection of the ODD with the training set. In this methodology, the validation structure would stress scenarios within the explicit training realm and then build tests outside the training realm to validate that the inference functions match the ODD expectations.

Generally speaking, an ML component is trained using datasets containing samples drawn from the ODD. Ideally the training and validation datasets provide representative coverage of the ODD. Similarly, the test dataset should provide a thorough and representative coverage of the ODD, especially to exercise requirements and use cases for the ML component. In addition, validation tests should attempt to exercise the "worst-case" situations. Such situations may be found near the boundaries between the ODD and OOD, or near regions of the ODD not covered in the initial Training and Validation datasets. For verification, validation and certification (VV&C) purposes, there is a need to qualify systems against their designed functionality, as well as against a fault-propagation/coupled-modes scenario.

ML and AI often require large quantities of data to train, validate (score) and test (evaluate) an ML model. For a variety of use cases, the data needed for this work is either non-existent, scarce (occurring infrequently), hard or costly to acquire, or subject to access restrictions due to the sensitivity of the data. Sensitive data may include asset locations, proprietary messages within a data stream, configuration of devices including IP addresses, or Personally Identifiable Information (PII), for example.

Managing the data scarcity problem is a topic of active research. Current data generation techniques range from rudimentary approaches such as random over-sampling to augment a dataset, to sophisticated modelling and simulation. Consider the situation of needing balanced sets of data for two classes in order to build a classifier model. For example, randomly oversampling minority observations in an imbalanced dataset may copy or duplicate the entire feature set of the minority class. While this leads to a more balanced dataset, the quality is questionable as it does not provide a statistically meaningful representation of the original dataset. There may also be missed opportunities in the training framework for edge cases and validation testing.

One challenge is to create or augment an existing dataset synthetically, such that it still retains the underlying properties of the original "ground truth" dataset and remains in the ODD. To build meaningful training data and aid in the validation task, data transformation functions should be built which go beyond simple replication and reflect naturally occurring variations. Such a transformation becomes part of the overall approach and offers insights into the problem space.

By way of example, consider the popular ML application of object recognition. One algorithmic transformation would be to rotate the object in random positions to build a much larger synthetic training set. To test the resulting ML inference engine, other random rotations may be built for validation. In this paradigm, Newtonian reorientations are legal movements in the ODD space, and the transformation algorithm/ML inference form the overall state-tensor solutions.

Similarly, in the space of signal processing, VAEs can be used as transformation functions. VAEs, like other autoencoders, include an encoder, a decoder, and latent space in between, as shown in the example embodiment of the controller 34 shown in FIG. 2. In the illustrated VAE, an encoder 40 learns to compress (reduce) the original input data into an encoded representation of a normal distribution in latent space provided by a neural network 42 (e.g., a convolutional neural network, CNN). A decoder 43 learns to reconstruct the original data from the encoded representation to be as close to the original input as possible. The latent space is the layer that contains the compressed representation of the input data.

The VAE 35 differs from regular autoencoders in that it does use the encoding-decoding process simply to reconstruct an input. Instead, the VAE 35 imposes a probability distribution on the latent space and learns the distribution so that the distribution of the outputs from the decoder 43 matches that of the observed data. The VAE 35 assumes that the source data has some sort of underlying probability distribution (such as Gaussian) and then attempts to find the parameters of the distribution.

The controller 36 advantageously provides an effective way to generate synthetic data for training ML applications such as anomaly detection. In particular, this may be done while maintaining the underlying statistical properties of the original dataset, it may be applicable to sensitive datasets where traditional data masking falls short of protecting the data, and it may provide faster methods of generating synthetic training data for ML applications.

By way of background, a VAE is a generative system and serves a similar purpose as a generative adversarial network. One main use of a VAE is to generate new data that is related to the original source data by sampling from the learned distribution. Utilizing the learned distribution provides a way of generating synthetic data that is reflective of naturally occurring variations, rather than simply replicating existing data samples. This new synthetic data may be utilized for additional training and testing analysis. Moreover, a VAE is a generative model which may randomly generate new samples based on the learned distribution. However, unlike traditional generative models that require strong assumptions regarding data structures and long inference times, a VAE makes weak assumptions of the data which also leads to faster training.

The VAE 35 forces input images onto an n-dimensional probability distribution (such as the 20-dimensional Gaussian shown in the example of FIG. 2), learns the associated parameters (e.g., the 20 means and variances for a Gaussian distribution), and describes the data seen on an antenna 32 with the resulting distribution. Synthetic data samples may be randomly generated from a probability distribution in latent space once the associated parameter value vectors are calculated.

The controller 34 may utilize a two-step process to generate synthetic data samples by (1) using the VAE 35 to learn the statistical properties of the original dataset(s) sampled from the ODD; and (2) using the processor 36 as an optimizer for sampling the learned distribution and applying algorithmic transformations (e.g., rotations, reflections and attenuation) that enable building of richer datasets to support the ML model V&V process. More particularly, this approach provides an enhanced VAE-based process flow to learn the distribution and associated statistical properties of the original dataset (ideally the distribution of data in the ODD). Input data is provided, which in the present example includes antenna gain pattern images 44, and a subset or mini batch is selected at random.

Generally speaking, input data may come from signals or other data that is converted to 2D imagery to leverage the convolutional neural network(s) 42 which underlies the VAE 35. The input data can represent any aspect or aspects of one or more devices and/or processes of a distributed system of interest. In the example of a computer network, the data can include overall network performance, individual device performance, performance of multiple devices clustered together, usage parameters such as bandwidth usage or CPU (central processing unit) usage, memory usage, connectivity issues, Wi-Fi coverage, cellular signal, syslog, Netflow, data logs, intrusion detection system alerts and more. In the example of an air traffic control system, data can include the overall performance, individual device performance, performance of multiple devices clustered together, parameters such as latitude, longitude, altitude, and more. As noted above, for the present application of an antenna system, the input data includes the gain patterns images 44 corresponding to respective antenna 32 coverage.

For image-based inputs, an image gradient Sobel edge detector may be used as a pre-processing step. This preprocessing step helps the Deep Learning Convolutional Neural Network models to learn more quickly and with more accuracy. Next, the data is provided to the encoder 40 of the VAE 35. The encoder forces the input data (images 44) onto the multidimensional probability distribution. Again, this is a 20-dimensional Gaussian distribution in the present example, although other distributions and dimensions may also be utilized in different embodiments. The VAE 35 learns the means and variances of the data, and the resulting distribution describes the data.

The encoder 40 generates a compressed representation of the input data utilizing various weights and biases. Weights are the parameters within the neural network 42 that transform input data within the network's hidden layers. Generally speaking, the neural network 42 is made up of a series of nodes. Within each node is a set of inputs, weight, and a bias value. As an input enters the node, it gets multiplied by a weight value, and the resulting output is either observed or passed to the next layer in the neural network 42. The weights of the neural network 42 may be included within the hidden layers of the network. Within the neural network 42, an input layer may take the input signals and pass them to the next layer. Next, the neural network 42 includes a series of hidden layers which apply transformations to the input data. It is within the nodes of the hidden layers that the weights are applied. For example, a single node may take the input data and multiply it by an assigned weight value, then add a bias before passing the data to the next layer. The final layer of the neural network 42 is known as the output layer. The output layer often tunes the inputs from the hidden layers to produce the desired numbers in a specified range.

Weights and bias values are both learnable parameters inside the network 42. The neural network 42 may randomize both the weight and bias values before learning initially begins. As training continues, both parameters may be adjusted toward the desired values and the correct output. The two parameters differ in the extent of their influence upon the input data. At its simplest, bias represents how far off the predictions are from their intended value. Biases make up the difference between the function's output and its intended output. A low bias suggests that the network 42 is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will more significantly change the output.

The compressed representation of the input data is called the hidden vector. The mean and variance from the hidden vector are sampled and learned by the CNN 42. Principal component analysis (PCA) of the hidden vector allows for the visualization of n-dimensional point clusters, e.g., 3-D point clusters, in the latent space. To make calculations more numerically stable, the range of possible values may be increased by making the network learn from the logarithm of the variances. Two vectors may be defined: one for the means, and one for the logarithm of the variances. Then, these two vectors may be used to create the distribution from which to sample.

The decoder 43 generates synthetic output data. The controller 36 functions as an optimizer which uses an ensemble of solvers 45-47 with a game theoretic implementation to create an output image with least image reconstruction error. An input module 48 computes a gradient of loss function from the synthetic output data, and an output module 49 picks the best update based upon the solvers 45-47. More particularly, the optimizer process is iterated via reparameterization to handle sampling of the hidden vector during backpropagation (an algorithm for training neural networks). In the illustrated example, an ensemble of models is generated using the three different solvers, namely an Adam solver 45, a Stochastic Gradient Descent with Momentum (SGDM) solver 46, and a Root Mean Squared Propagation (RMSProp) solver 47, although different solvers may be used in different embodiments. The values from the loss function (evidence lower bound or ELBO, reconstruction, and Kullback-Leibler or KL loss) may be used in a game theoretic implementation to determine the optimal model to use per test sample. The loss is used to compute the gradients of the solvers.

Figure 2:
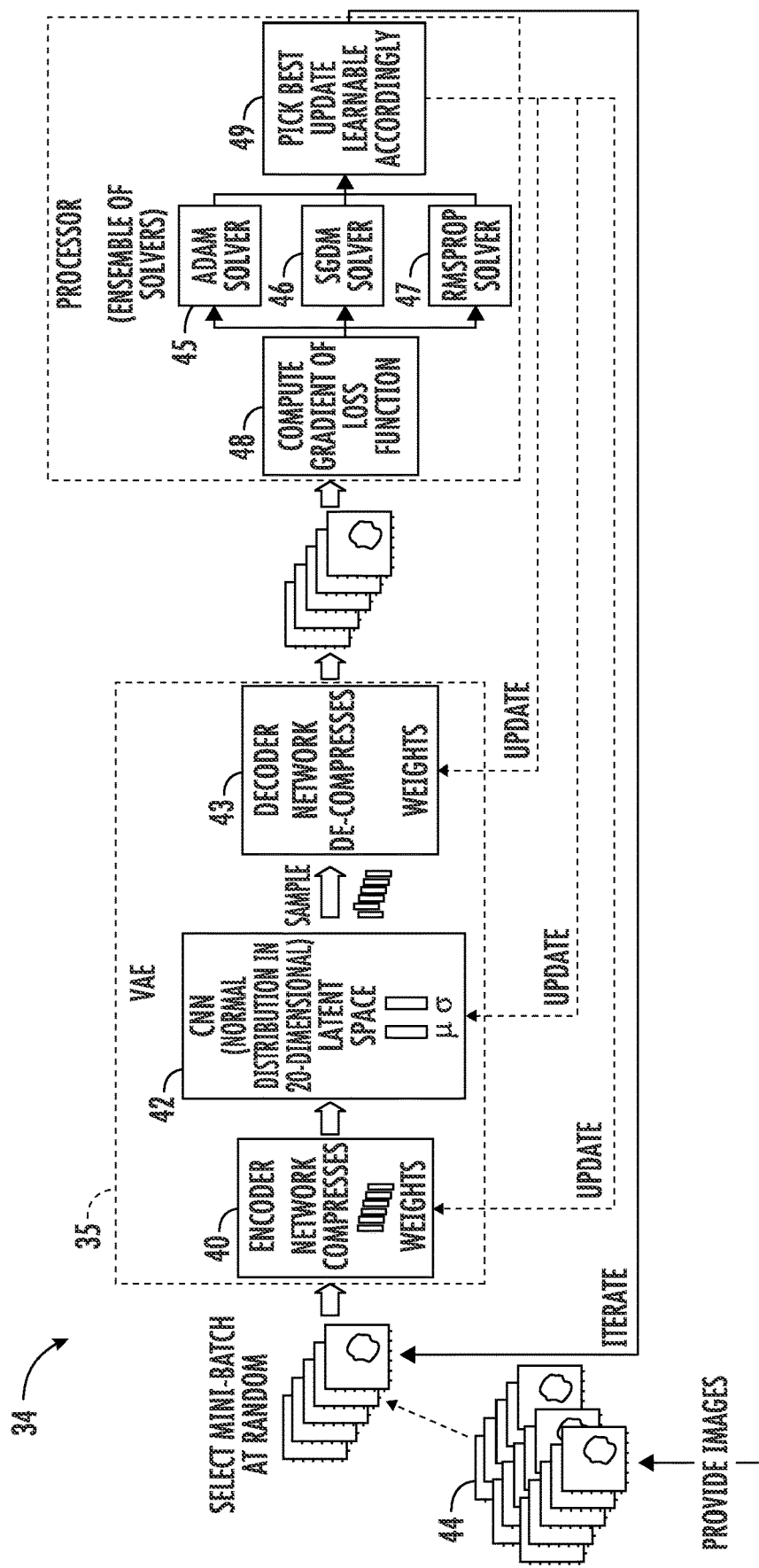
FIG. 2 is a schematic block diagram illustrating an example implementation of the controller of the system of FIG. 1 in greater detail.
Figure 3:
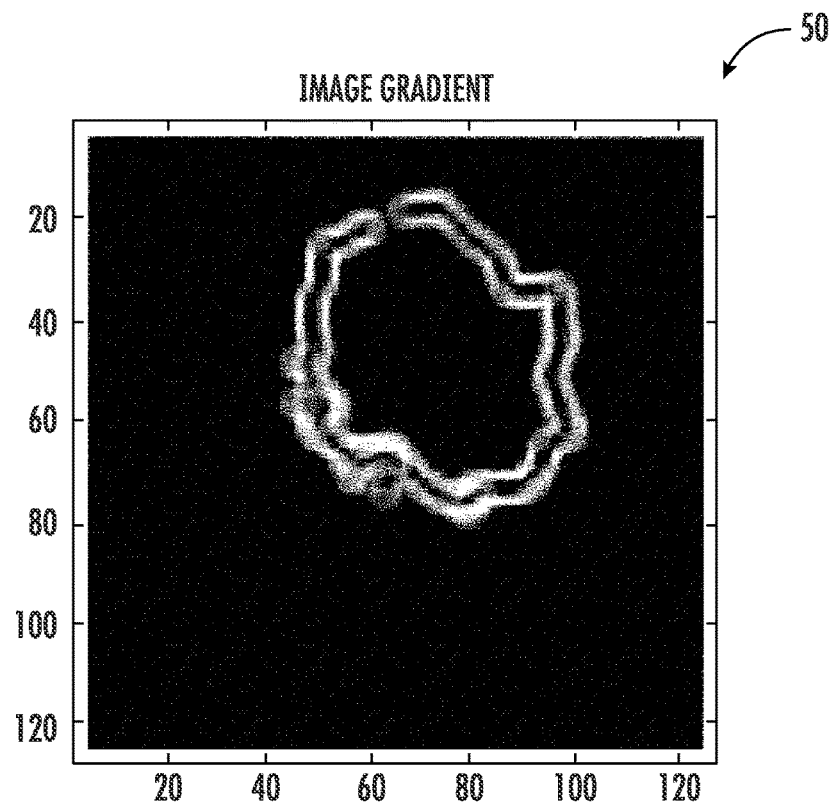
FIGS. 3-6 are plots of antenna gain patterns depicting various VAE training steps which may be performed by the controller of the system of FIG. 1.
Figure 4:
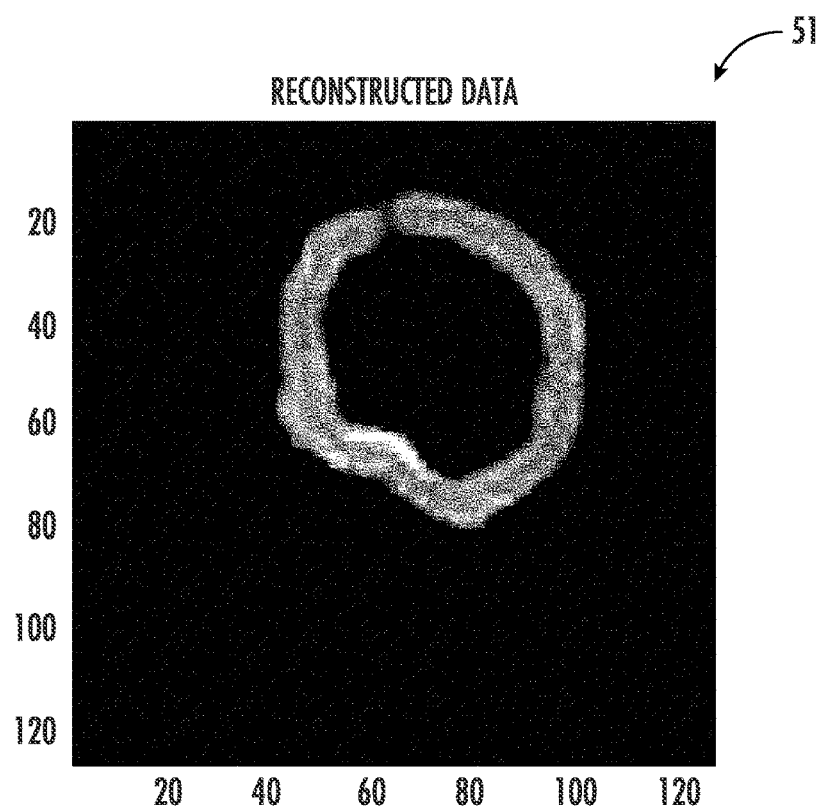
Figure 5:
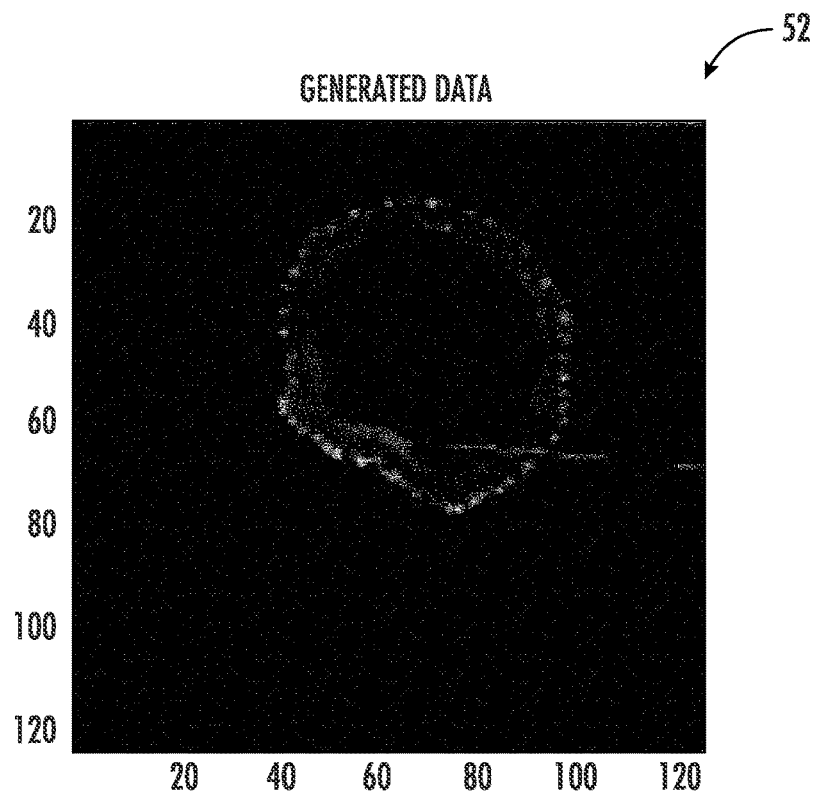
Figure 6:
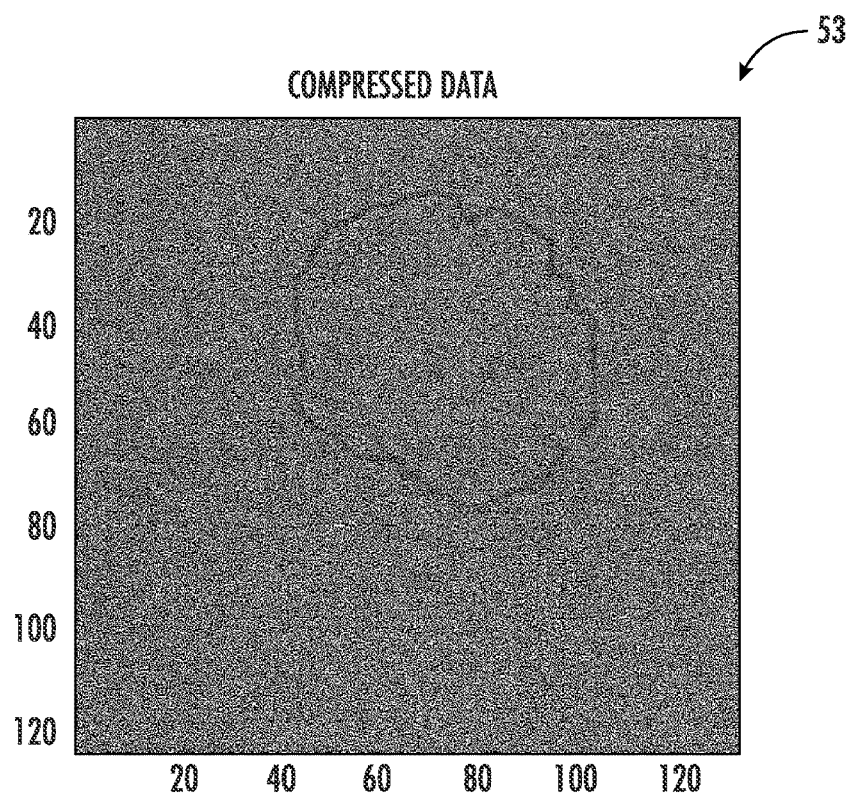

To summarize, the controller 34 illustrated in FIG. 2 performs the following steps:
a) Providing input image data representative of the operational design domain to the encoder 40 of the VAE 35;
b) Compressing the input image data using a first set of weights with the encoder;
c) Creating a normal distribution of the compressed image data in a latent space of the VAE;
d) Decompressing the compressed image data from the latent space using a second set of weights with the decoder 43 of the VAE;
e) Optimizing the decompressed image data from the decoder, which may further include (i) generating multiple of probabilistic models of the decoded image data, and (ii) determining which of the multiple models is optimal by applying a game theoretic optimization to select which model to use;
f) Updating at least the first and second set of weights based on the loss detected in the optimized decompressed image data, which may include (i) applying a game theoretic optimization to the models; and (ii) selecting which model (e.g., Adam, SGDM, or RMSProp) to use to update the first and second sets of weights; and
g) Iterate steps b)-f) until the decompressed image data possesses substantially the same statistical properties as the input image data (such statistics include ELBO loss, which is reconstruction loss plus KL loss (described below)).

Steps b)-f) may be iterated until the error does not statistically decrease and validation patience is achieved (i.e., the number of times that the validation loss can be larger than or equal to the previously smallest loss before network training stops).

Once the Latent Space distribution of the original dataset has been learned/optimized, synthetic datasets may be generated. For example, a sample may be randomly generated from the learned distribution in latent space. Next, the decoder 43 may be applied to the sample to generate a new datum. Afterwards, algorithmic transformations may be applied, as appropriate, to generate additional data points for the validation test dataset. Such transformations may include attenuation, reflecting or rotating images. Multiple transformations may be applied to a single sample from the latent space distribution, to quickly increase the size of a synthetic dataset.

The graphs 50-52 of FIGS. 3-6 illustrate various VAE training steps. In the graph 50, image gradient, the Sobel edge detector is run on raw antenna gain pattern data, resulting in the highlighted pattern shown. The preprocessed data is then run through the VAE 35, and the resulting reconstructed data is shown in the graph 51. Certain select portions of the data are kept, e.g., 72 data points out of 360 (e.g., corresponding to a sampling of every five degrees), and the result is shown in the graph 51. Finally, the pixels along each five degrees radial line from center outward are analyzed and the pixel with the highest magnitude is kept as a compressed point, and the result is shown in the compressed data graph 53.

There are several technical advantages to this approach to synthetic data generation, which may include: (1) preserving the underlying statistical properties of the original "truth" dataset; (2) applicability to sensitive datasets where traditional data masking falls short of protecting the data; (3) generating synthetic training data faster by using backpropagation as part of the Deep Learning CNN 42; (4) utilizing a custom encoder-decoder architecture in the Deep Learning CNN; (5) employing game theoretic optimization to select best performing deep learning model with an ensemble of solvers 45-47 (SGDM, Adam, RMSProp) to find minimum cost function loss (error); (6) generating synthetic data samples that possess the statistical properties of the original dataset; and (7) applying algorithmic transformations (e.g. attenuation, rotations) to expand inputs to a generated dataset.

Figure 7:
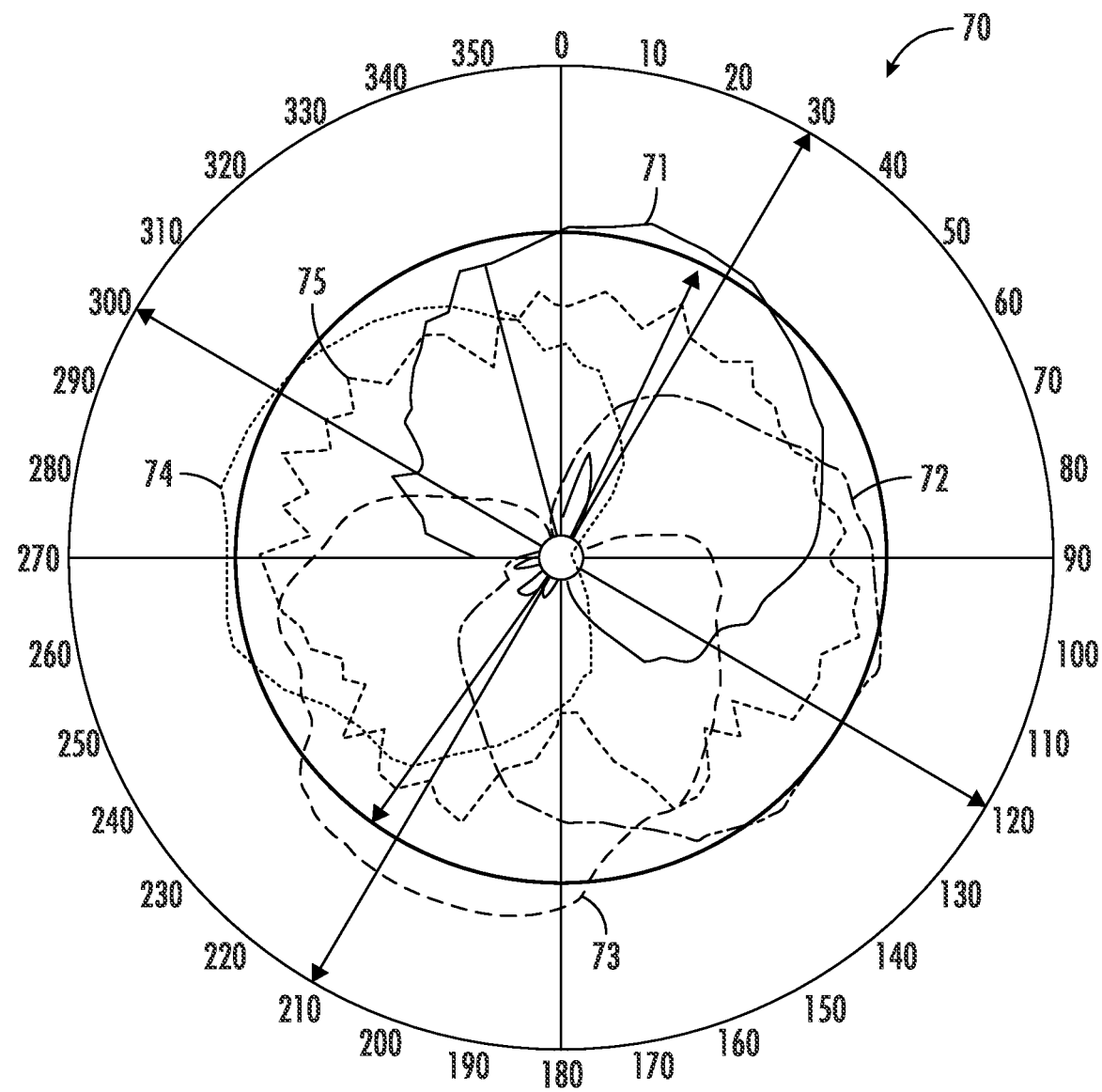
FIGS. 7 and 8 are graphs of normal and abnormal antenna channel gain patterns, respectively, which may be utilized by the controller of the system of FIG. 1 for anomaly detection in an example embodiment.
Figure 8:
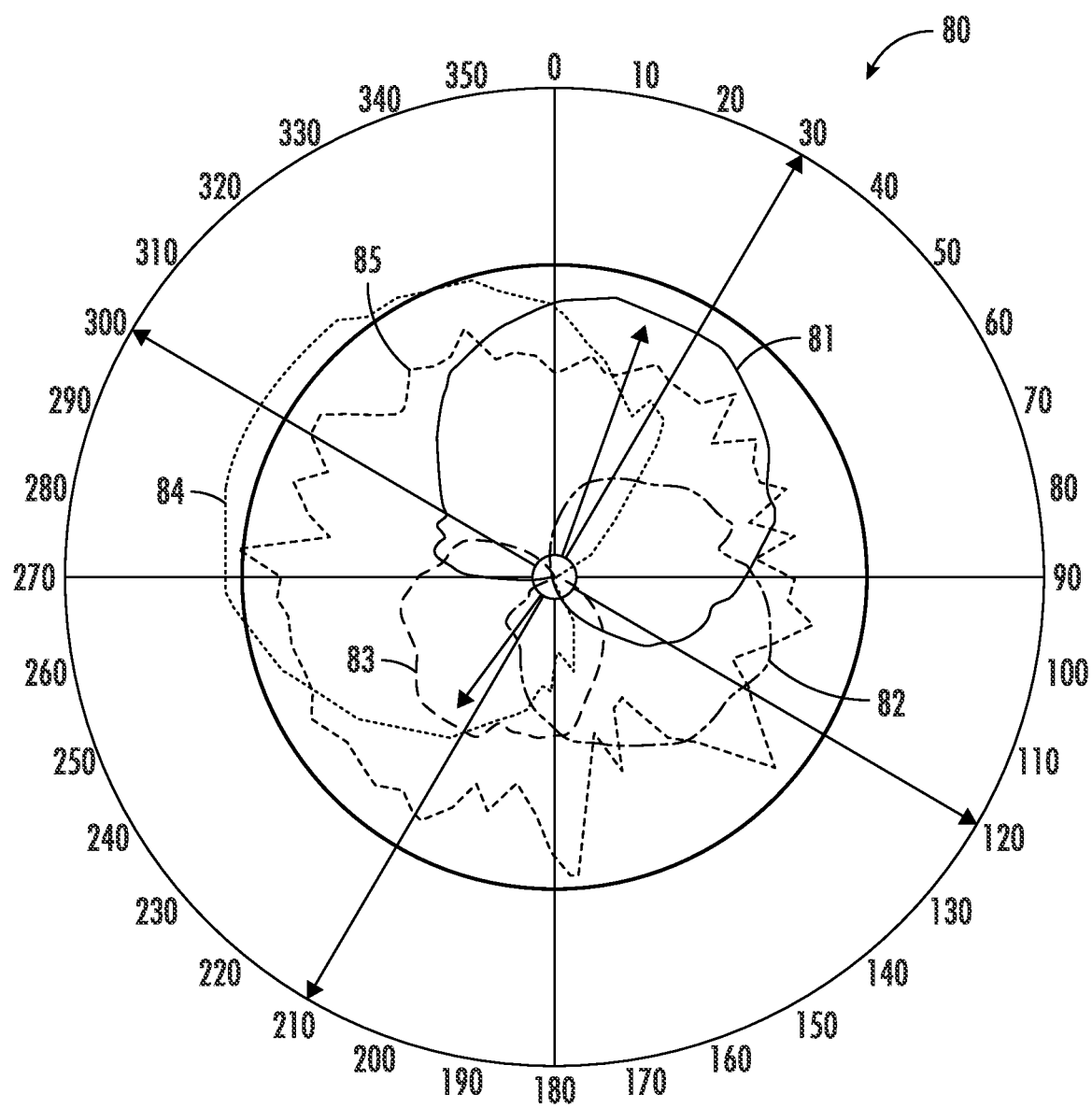

Reference is now made to the gain pattern diagrams 70 and 80 of FIGS. 7 and 8 to illustrate the use of synthetic data for ML model validation in the context anomaly detection in antenna gain patterns. In the diagram 70, there are five different gain patterns 71-75 for an antenna each corresponding to operation on a different channel. In the diagram 80, corresponding gain patters 81-85 are shown for the same antenna over the same channels after an issue with the antenna occurs (which will be discussed further below).

ADS-B is an advanced surveillance technology that combines an aircraft's positioning source, aircraft avionics, and a ground infrastructure to create an accurate surveillance interface between aircraft and air traffic control. In the present approach, ADS-B Antenna Anomaly Detection ML is used to classify antenna channel gain patterns as normal or abnormal. One particular advantage of the system 30 is to provide better decisions as to if/when a technician needs to be sent to an antenna 32 site to investigate the root cause of anomalous measurements. The use case described herein focuses on the quad sectorized antenna, each covering 90-degrees of azimuth. Generally, an ADS-B ground station 31 would use four quad sectorized antennas 32 to achieve 360-degree coverage. Together, these antennas form a "clover-leaf" aggregate antenna gain pattern as seen in FIG. 7. It will be appreciated, however, that the approach described herein may be used with other wireless/antenna systems as well in different embodiments.

When each antenna 32 is analyzed, being careful to compare new data with known normal data, potential anomalies can be detected. In FIG. 7, gain patterns 72 and 72 (corresponding to antenna channels 2 and 3) are normal at the time, but the corresponding gain patterns 81 and 82 are abnormal in FIG. 8 when measured at a later time.

Figure 9:
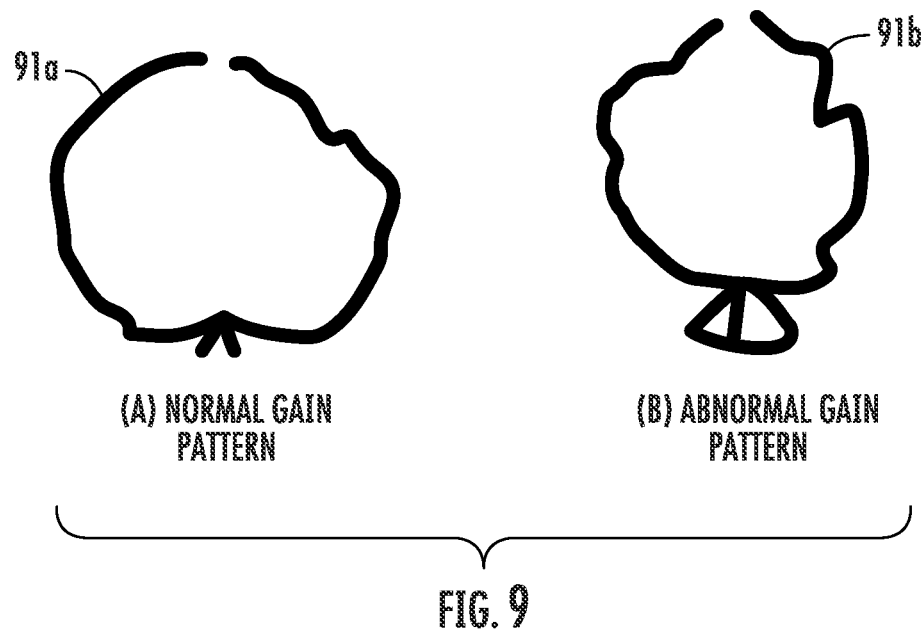
FIGS. 9(*a*) and 9(*b*) are graphs of another set of normal and abnormal antenna channel gain patterns, respectively, which may be utilized by the controller of the system of FIG. 1 for anomaly detection in an example embodiment.
Figure 10:
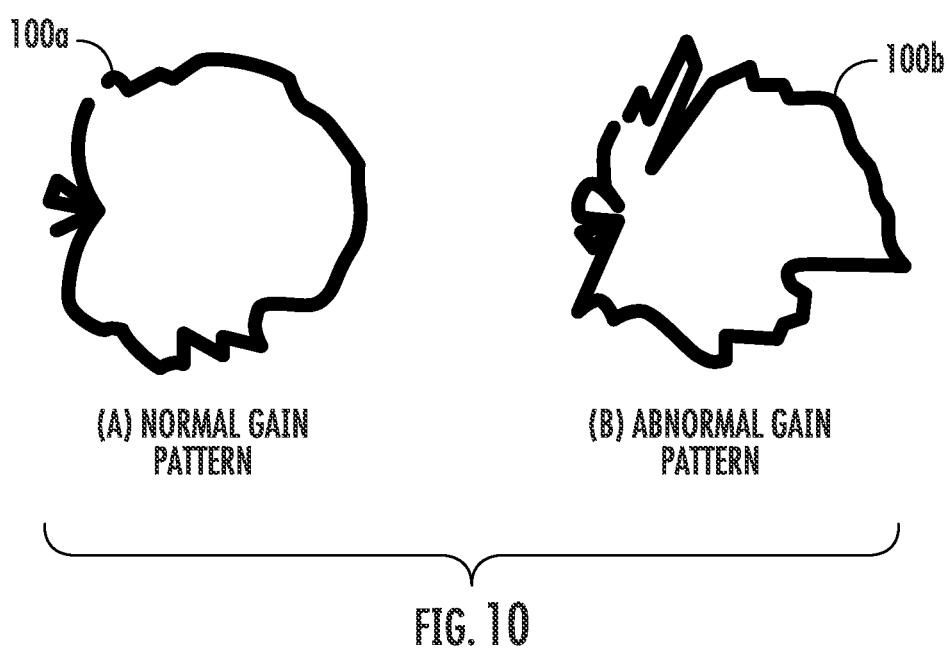
FIGS. 10(*a*) and 10(*b*) are graphs of still another set of normal and abnormal antenna channel gain patterns, respectively, which may be utilized by the controller of the system of FIG. 1 for anomaly detection in an example embodiment.

Manual inspection to find anomalies for thousands of antennas, as deployed in the US ADS-B infrastructure, is impractical. The controller 34 advantageously provides for the training of an anomaly detection classifier with data from the quad-sectorized (or other) antennas, to thereby automatically detect and/or predict such anomalies and deploy maintenance resources more efficiently on an as needed basis. In the present example, training data may include good or nominal antenna channel gain patterns for each of the four channels (see, e.g., sample normal/abnormal gain patterns 91a/91b of FIG. 9, and 100a/100b of FIG. 10). Each of the four channels has its own class for normal patterns. Training data may also include anomalous patterns for any of the four channels, grouped together in one class. The term "anomalous" is used herein to refer to measurements that are off-nominal—i.e. a significant deviation from the historical norm.

Anomalous gain patterns are potentially troublesome, but not always. Irregular gain patterns might be indicative of Radio Line of Sight (RLOS) obstructions (e.g., buildings, terrain, etc.). Such patterns might also just be driven by a lack of targets of opportunity (TOOs) possibly due to time of day (e.g., middle of the night) or bad weather during the hour(s) the data was collected. A bad hour (or bad few hours) is not as troublesome if the gain pattern eventually rights itself. To determine/confirm if a detected anomaly is something that needs to be addressed, the controller 34 may determine if the irregular shapes are persistent over time.

Additionally, an off-nominal antenna channel gain pattern may look like an attenuated version of a normal antenna channel gain pattern image. Examples of what this might indicate include (1) bad receiver card, (2) RF interference, (3) water in the transmission line, or (4) something else (antenna might be iced over or birds may have enclosed the antenna with a nest).

In the example ADS-B anomaly detection approach, the accuracy requirement was set at 95%, and the false positive rate was set at 5%. Accuracy was determined as $$\text{Accuracy} = \frac{\text{True Positives} + \text{True Negatives}}{\text{Total Sample Images}}$$

The ADS-B anomaly detection approach classifies antenna channel gain patterns as abnormal/off-nominal or as belonging to the nominal gain pattern classes for respective channels. A user may be alerted to antenna channel gain patterns classified as abnormal for further investigation if any of the conditions persist and do not autonomously recover.

Historical data may be used to train the ML model to determine what the norm is for the antenna channel gain patterns. Machine learning techniques may be applied to each individual antenna channel because differences in antenna type, the RF environment, surrounding terrain, and air traffic routes make each channel unique. Understanding changes is important so that a decision can be made to take corrective action, or do nothing.

Figure 11:
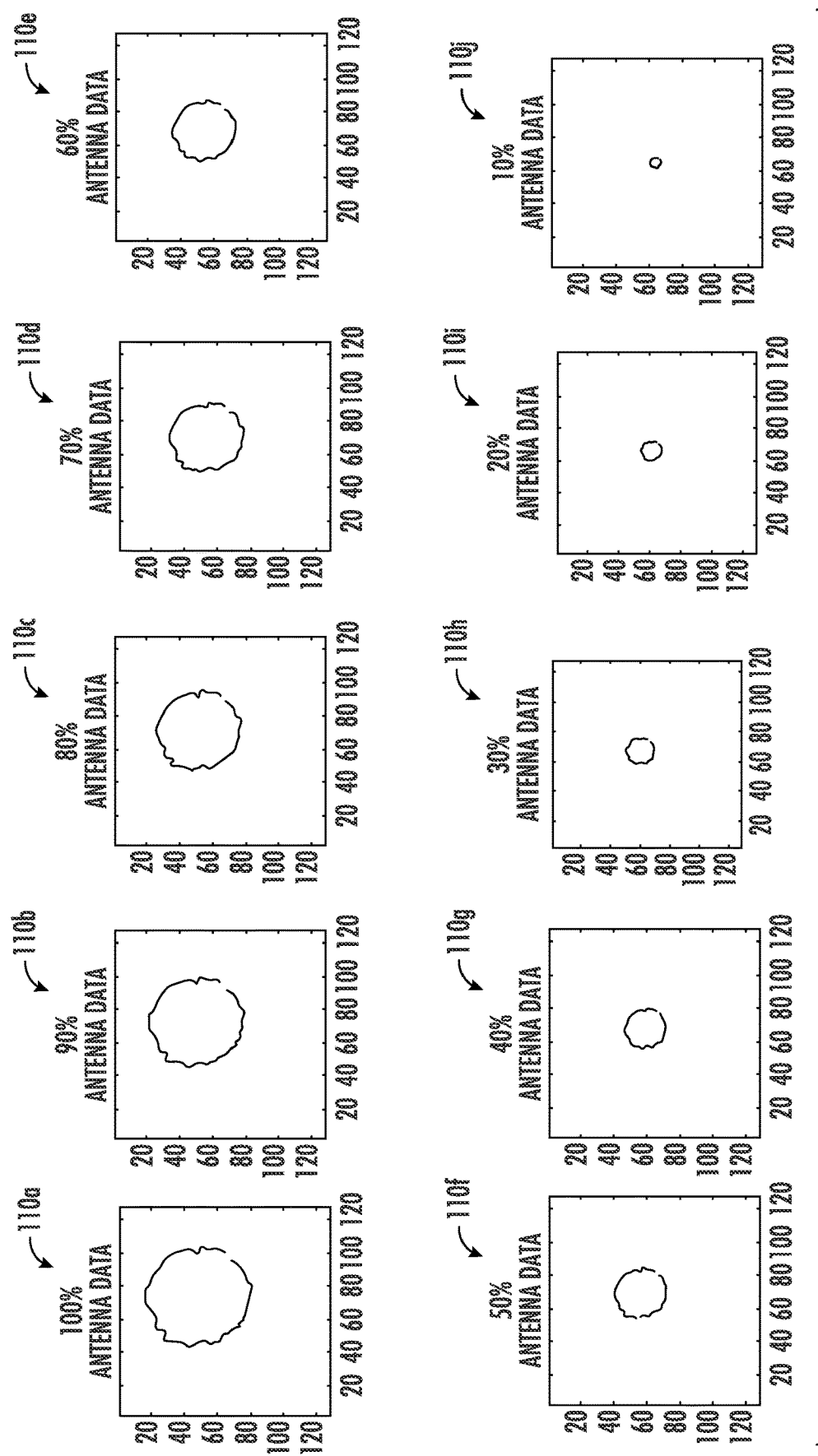
FIG. 11 is a series of graphs illustrating abnormal antenna channel gain pattern degradation which may be determined by the system of FIG. 1 in an example implementation.
Figure 12:
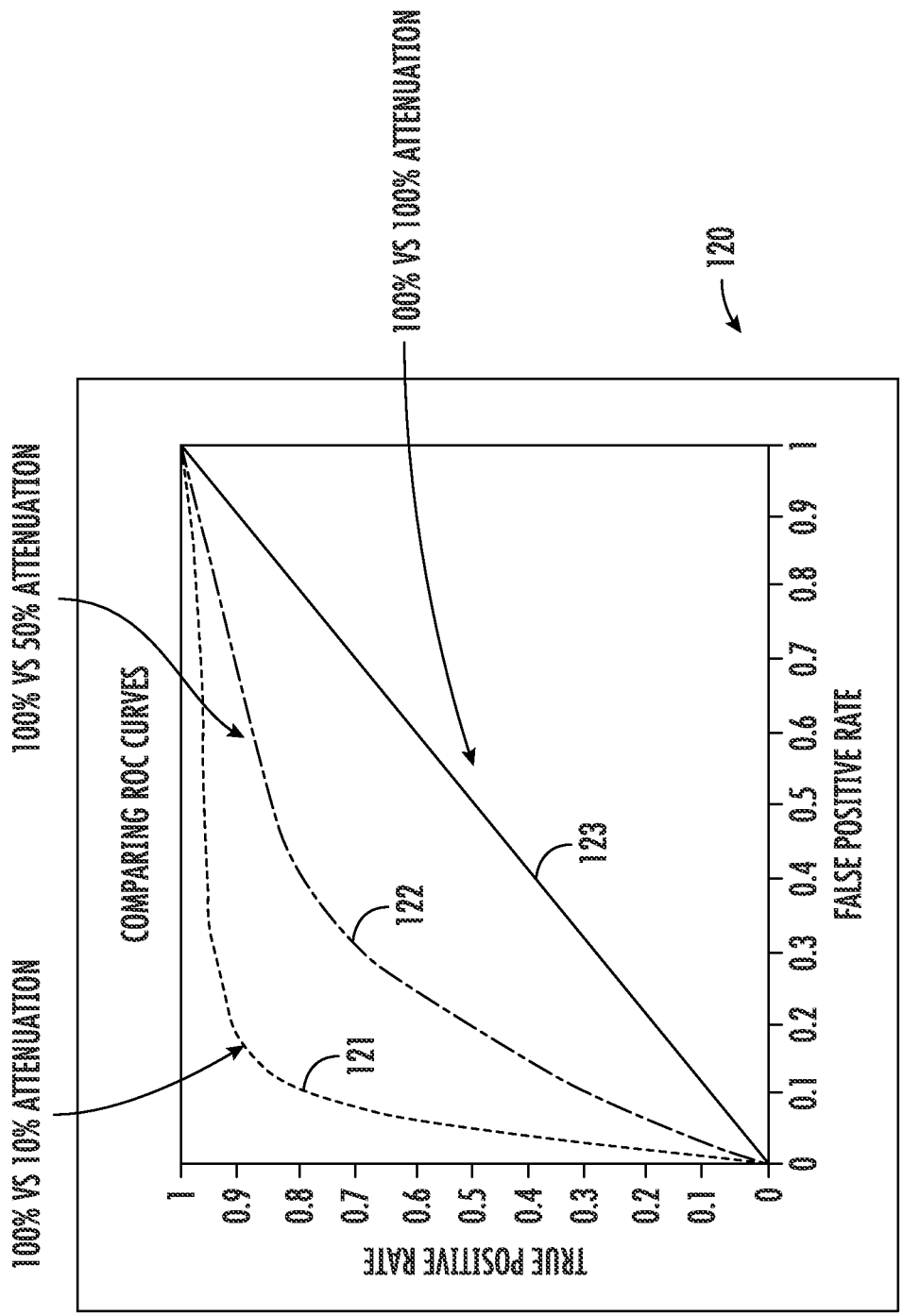
FIG. 12 is a graph of expected results for sensitivity analysis on attenuated gain pattern images in accordance with an example embodiment.

Turning additionally to FIG. 11, in an example test implementation of the ADS-B anomaly detection approach described above was used, and an evaluation of this classifier model is represented in the graph 120. More particularly, the graph 120 illustratively includes ROC curves 121-123 respectively corresponding to 100% vs 10% attenuation (excellent), 100% vs 50% attenuation (good), and 100% vs 100% attenuation (poor).

While the ADS-B Anomaly Detection Model was trained with off-nominal antenna channel gain patterns such as those discussed above, for purposes of the test a validation dataset was generated synthetically as discussed above. The latent space distribution was sampled, and then transformations were applied to generate attenuated versions of antenna channel gain patterns for channels 1-4, as well as anomalous patterns. The attenuation factors are illustrated in FIG. 11 by gain patterns 110*a*-110*j* for 100%, 90%, 80%, 70%, 60%, 50%, 40%, 30%, 20%, and 10% attenuation, respectively.

The ROC curve chart 120 illustrates the expected results for the sensitivity analysis. For instance, the expectation is the model will do very well classifying 10% attenuated gain pattern images as anomalous, as demonstrated by the ROC curve 121. Similarly, the model is expected to do well classifying 50% attenuated gain patterns as anomalous, as demonstrated by the ROC curve 122. For 100% attenuated gain patterns, which appear identical to the nominal gain pattern images, the model is expected to do no better than a coin flip, as demonstrated by the ROC curve 123.

Figure 13:
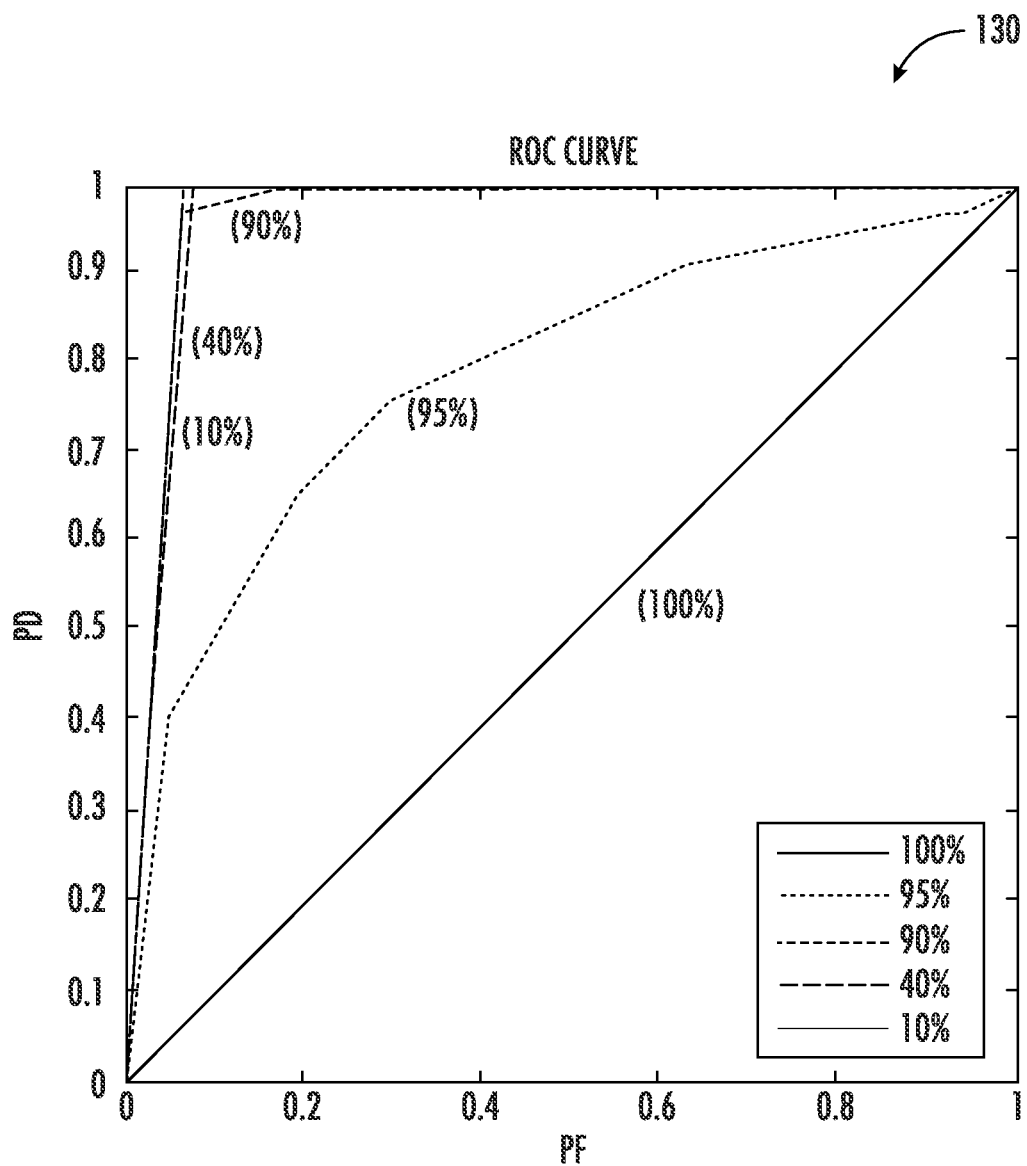
FIG. 13 is a graph summarizing sensitivity analysis for nominal vs. antenna attenuated gain patterns in an example embodiment.

Another ROC curve chart 130 is provided in FIG. 13, which highlights the model's performance at several of the attenuation factor levels (10%, 40%, 90%, 95% and 100%). Key findings, outlined below, indicate that the prototype model is usable for attenuation levels as high as 95%. The results demonstrate that the ADS-B anomaly detection model may classify anomalies even with as little deflation (attenuation) as 90%, with a confidence of 95% (AUC). If the deflation due to anomalies is 90% or less (i.e., 90<attenuation≤95), the ADS-B anomaly detection model may determine nominal from anomalous antenna channel gain patterns with a confidence of 90%.

In summary, validation of ML components may be difficult, requiring an understanding of the ODD and its intersection with the datasets used for training. Ideally, the training dataset will include representative samples drawn from across the ODD region. Synthetic data may be utilized in the validation of ML components in cases where the needed data is non-existent, too hard or costly to acquire, or has access restrictions due to the sensitivity of the data. The above-described approach advantageously utilizes VAEs with game theory to learn the underlying distribution of data in the latent space. The VAE 35 may then sample from this distribution to generate new, synthetic data that possesses a statistical distribution that is similar to the original dataset. Finally, the present approach advantageously combines the VAE 35 with the controller 36 which applies game theory to the problem of finding anomalies in antenna channel gain patterns.

Figure 14:
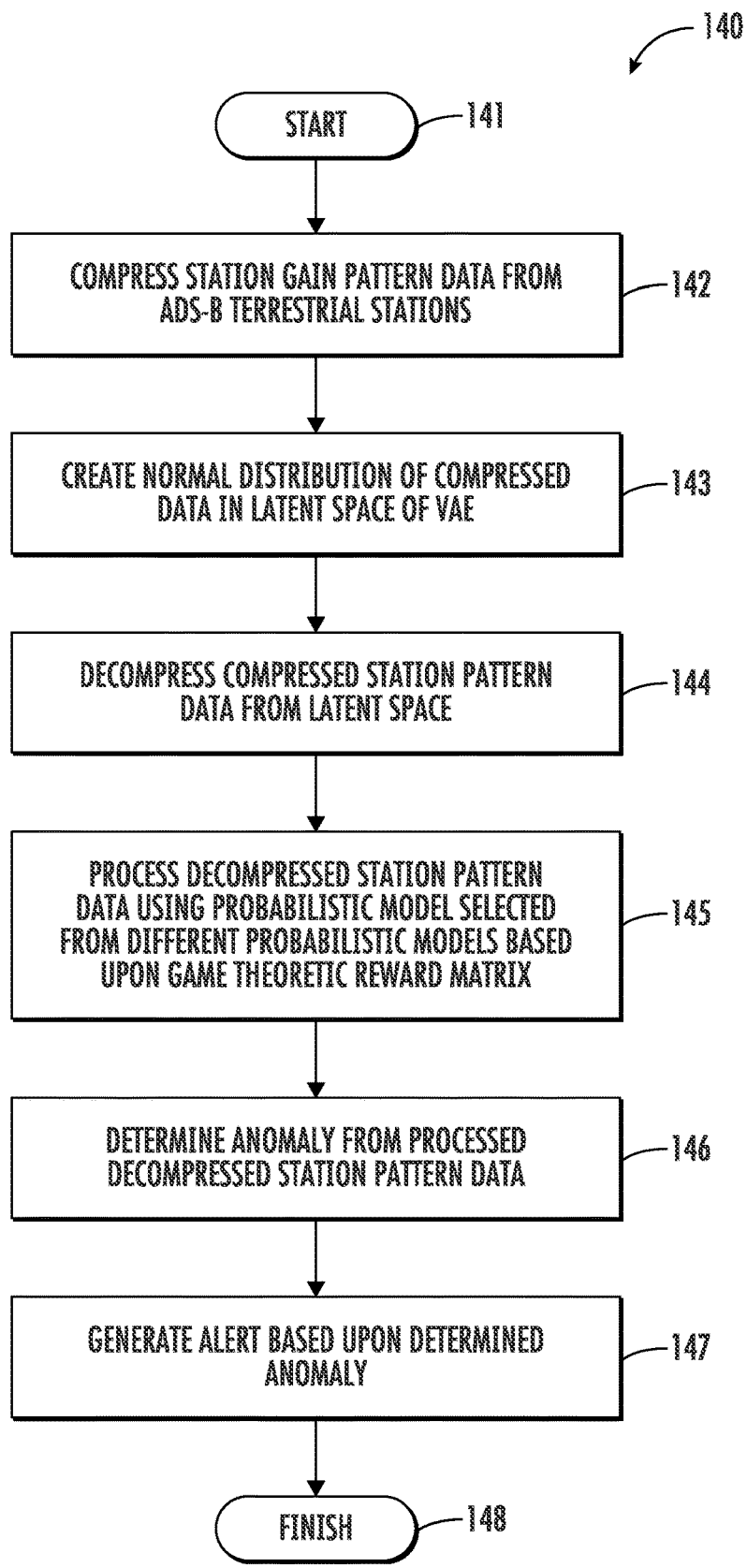
FIG. 14 is a flow diagram illustrating method aspects associated with the system of FIG. 1.

Turning now to the flow diagram of FIG. 14, related method aspects of the system of FIG. 1 are now described. Beginning at Block 141, the method illustratively includes using the VAE 35 for compressing station gain pattern data from the plurality of ADS-B terrestrial stations 31 (Block 142), creating a normal distribution of the compressed data in a latent space of the VAE (Block 143), and decompressing the compressed station pattern data from the latent space (Block 144). The method further illustratively includes using the processor 36 for processing the decompressed station pattern data using a probabilistic model selected from among a plurality of different probabilistic models based upon a game theoretic reward matrix (Block 145), determining an anomaly from the processed decompressed station pattern data (Block 146), and generating an alert based upon the determined anomaly (Block 147), as discussed further above. The method of FIG. 14 illustratively concludes at Block 148.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. An Automatic Dependent Surveillance Broadcast (ADS-B) system comprising:
   a plurality of ADS-B terrestrial stations, each ADS-B terrestrial station comprising an antenna and wireless circuitry associated therewith defining a station gain pattern; and
   a controller comprising
      a variational autoencoder (VAE) configured to
         compress station gain pattern data from the plurality of ADS-B terrestrial stations,
         create a normal distribution of the compressed data in a latent space of the VAE, and
         decompress the compressed station pattern data from the latent space; and
      a processor coupled to the VAE and configured to
         process the decompressed station pattern data using a probabilistic model selected from among a plurality of different probabilistic models based upon a game theoretic reward matrix,
         determine an anomaly from the processed decompressed station pattern data, and
         generate an alert based upon the determined anomaly.

2. The ADS-B system of claim 1 wherein the VAE is configured to compress the station pattern data with a first set of weights, and decompress the compressed station pattern data with a second set of weights different than the first set of weights.

3. The ADS-B system of claim 2 wherein the processor is configured to update at least one of the first and second sets of weights based upon a loss detected in the processed decompressed station pattern data.

4. The ADS-B system of claim 1 wherein the station gain pattern corresponds to different radio frequency (RF) channels.

5. The ADS-B system of claim 1 wherein the processor is configured to process the decompressed station pattern data using the probabilistic model based upon historical gain pattern data for respective antennas.

6. The ADS-B system of claim 1 wherein the plurality of different probabilistic models comprises at least one of ADAM, Stochastic Gradient Descent with Momentum (SGDM), and RMSProp deep learning models.

7. The ADS-B system of claim 1 wherein the alert comprises a service alert for service to be performed at a corresponding ADS-B terrestrial station having the determined anomaly.

8. A controller for an Automatic Dependent Surveillance Broadcast (ADS-B) system, the controller comprising:
   a variational autoencoder (VAE) configured to
      compress station gain pattern data from a plurality of ADS-B terrestrial stations, each ADS-B terrestrial station comprising an antenna and wireless circuitry associated therewith defining a station gain pattern,
      create a normal distribution of the compressed data in a latent space of the VAE, and
      decompress the compressed station pattern data from the latent space; and
   a processor coupled to the VAE and configured to
      process the decompressed station pattern data using a probabilistic model selected from among a plurality of different probabilistic models based upon a game theoretic reward matrix, determine an anomaly from the processed decompressed station pattern data, and generate an alert based upon the determined anomaly.

9. The controller of claim 8 wherein the VAE is configured to compress the station pattern data with a first set of weights, and decompress the compressed station pattern data with a second set of weights different than the first set of weights.

10. The controller of claim 9 wherein the processor is configured to update at least one of the first and second sets of weights based upon a loss detected in the processed decompressed station pattern data.

11. The controller of claim 8 wherein the station gain pattern corresponds to different radio frequency (RF) channels.

12. The controller of claim 8 wherein the processor is configured to process the decompressed station pattern data using the probabilistic model based upon historical gain pattern data for respective antennas.

13. The controller of claim 8 wherein the plurality of different probabilistic models comprises at least one of ADAM, Stochastic Gradient Descent with Momentum (SGDM), and RMSProp deep learning models.

14. The controller of claim 8 wherein the alert comprises a service alert for service to be performed to the antenna.

15. A method for operating an Automatic Dependent Surveillance Broadcast (ADS-B) system, the method comprising:

using a variational autoencoder (VAE) for compressing station gain pattern data from a plurality of ADS-B terrestrial stations, each ADS-B terrestrial station comprising an antenna and wireless circuitry associated therewith defining a station gain pattern, creating a normal distribution of the compressed data in a latent space of the VAE, and decompressing the compressed station pattern data from the latent space; and using a processor for processing the decompressed station pattern data using a probabilistic model selected from among a plurality of different probabilistic models based upon a game theoretic reward matrix, determining an anomaly from the processed decompressed station pattern data, and generating an alert based upon the determined anomaly.

16. The method of claim 15 wherein compressing comprises compressing the station pattern data with a first set of weights, and decompressing comprises decompressing the compressed station pattern data with a second set of weights different than the first set of weights.

17. The method of claim 16 comprising updating at least one of the first and second sets of weights based upon a loss detected in the processed decompressed station pattern data.

18. The method of claim 15 wherein the station gain pattern corresponds to different radio frequency (RF) channels.

19. The method of claim 15 wherein processing comprises processing the decompressed station pattern data using the probabilistic model based upon historical gain pattern data for respective antennas.

20. The method of claim 15 wherein the plurality of different probabilistic models comprises at least one of ADAM, Stochastic Gradient Descent with Momentum (SGDM), and RMSProp deep learning models.

* * * * *